(12) United States Patent
Batra et al.

(10) Patent No.: US 9,203,472 B2
(45) Date of Patent: Dec. 1, 2015

(54) AUTOMATIC GAIN CONTROL FOR POWER LINE COMMUNICATION

(71) Applicant: TEXAS INSTRUMENTS INCORPORATED, Dallas, TX (US)

(72) Inventors: Anuj Batra, Dallas, TX (US); Il Han Kim, Allen, TX (US); Mehul Madhav Soman, Dallas, TX (US); Minghua Fu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/510,944

(22) Filed: Oct. 9, 2014

(65) Prior Publication Data

US 2015/0098515 A1   Apr. 9, 2015

Related U.S. Application Data

(60) Provisional application No. 61/888,714, filed on Oct. 9, 2013.

(51) Int. Cl.
*H04B 3/00* (2006.01)
*H04L 27/08* (2006.01)
*H04B 3/54* (2006.01)

(52) U.S. Cl.
CPC .......................... *H04B 3/54* (2013.01)

(58) Field of Classification Search
CPC ................................ H04B 3/54; H04L 25/085
USPC .................................................. 375/257, 345
See application file for complete search history.

(56) References Cited

U.S. PATENT DOCUMENTS

| | | | |
|---|---|---|---|
| 5,463,662 A * | 10/1995 | Sutterlin et al. | 375/351 |
| 7,386,074 B1 * | 6/2008 | Venkatesh et al. | 375/345 |
| 2002/0041637 A1 * | 4/2002 | Smart et al. | 375/316 |
| 2009/0307540 A1 * | 12/2009 | Razazian et al. | 714/701 |

\* cited by examiner

*Primary Examiner* — Don N Vo
(74) *Attorney, Agent, or Firm* — John R. Pessetto; Frank D. Cimino

(57) ABSTRACT

A system includes an analog front end (AFE) unit to be coupled to a power line network, and a controller coupled to the AFE unit. More specifically, the AFE unit is to receive a packet signal from the power line network wherein, based on a first gain parameter, the AFE unit is to amplify the received packet signal. The controller is configured to calculate a root-mean-square (RMS) power of the amplified packet signal. Further, the AFE unit is to calculate a second gain parameter based on the calculated RMS power of the amplified packet signal and the first gain parameter, wherein the second gain parameter is to be used to amplify the received packet signal instead of the first gain parameter.

20 Claims, 2 Drawing Sheets

AUTOMATIC GAIN CONTROL FOR POWER LINE COMMUNICATION

CROSS-REFERENCE TO RELATED APPLICATION

This application claims the benefit of priority under U.S.C. §119(e) of U.S. Provisional Application 61/888,714 filed Oct. 9, 2013 and incorporated herein by reference.

BACKGROUND

A power line communication (PLC) is a communication technology to transmit data using power lines. Power lines may be used to transmit power to residences, buildings, etc. as well as data between senders and receivers. Generally, each receiver may be implemented as a modem to receive the data transmitted over the PLC network.

SUMMARY

A power line communication (PLC) system to automatically adjust a gain parameter is disclosed herein. In an embodiment, a system includes an analog front end (AFE) unit to be coupled to a power line network, and a controller coupled to the AFE unit. More specifically, the AFE unit is to receive a packet signal from the power line network wherein, based on a first gain parameter, the AFE unit is to amplify the received packet signal. The controller is configured to calculate a root-mean-square (RMS) power of the amplified packet signal. Further, the AFE unit is to calculate a second gain parameter based on the calculated RMS power of the amplified packet signal and the first gain parameter, wherein the second gain parameter is to be used to amplify the received packet signal instead of the first gain parameter.

In another embodiment, a system includes a front end unit to be coupled to a power line network and a controller coupled to the front end. The front end unit is to use a first gain parameter to amplify a packet signal received from a power line network. The controller is configured to receive the amplified packet signal from the front end unit and to calculate a difference value between a root mean square (RMS) power of the amplified packet signal and a target RMS power. More specifically, based on the difference value, the front end unit is to use a second gain parameter to replace the first gain parameter to amplify the received packet signal.

Yet in another embodiment, a method includes receiving, by an analog front end (AFE) unit, a packet signal from a power line network, based on a first gain parameter, amplifying, by the AFE unit, the received packet signal, and calculating, by a controller coupled to the AFE unit, a root mean square (RMS) power of the amplified packet signal. The method further includes calculating, by the controller, a difference value between the calculated RMS power and a target RMS power and, based on the difference value, adjusting the first gain parameter to amplify the received packet signal.

BRIEF DESCRIPTION OF THE DRAWINGS

For a detailed description of various examples, reference will now be made to the accompanying drawings in which.

DETAILED DESCRIPTION

Figure 1:
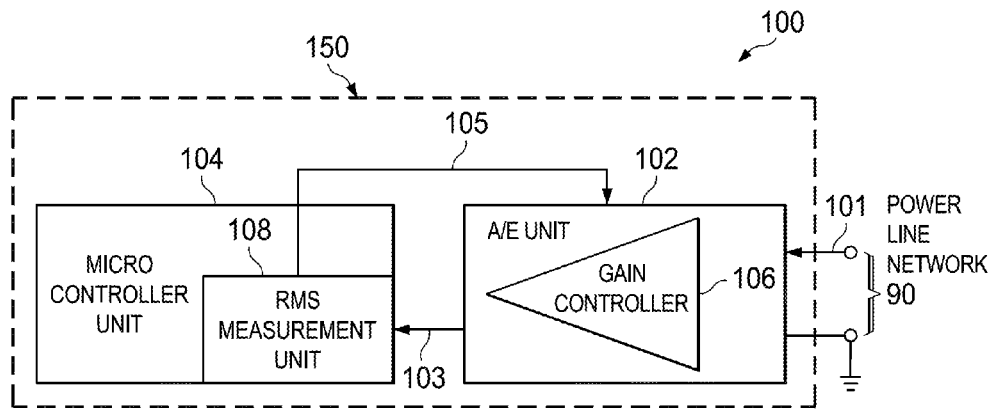
FIG. 1 shows a block diagram to illustrate a power line communication (PLC) modem in accordance with various examples.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct wired or wireless connection. Thus, if a first device couples to a second device, that connection may be through a direct connection or through an indirect connection via other devices and connections.

Power line communication (PLC) is a communication technology that enables sending data over power cables. More specifically, PLC carries data on a conductor (e.g., transmission line) to a device where the conductor is also operable simultaneously to transmit electric power. The electric power may include alternative current (AC) power, direct current (DC) power, etc. For example, with just power cables running to an electronic device, using the PLC can both provide the electronic device power and, at the same time, control/retrieve data from the electronic device.

In operation of the PLC, a sender modulates data to be sent, injects the modulated data onto the transmission medium (e.g., power line), and a receiver de-modulates the data to recover the data. A difference between the PLC and other communication technologies is that PLC uses existing cables to transmit data.

In general, a PLC modem is coupled to the power line to receive and decode data and messages from the power line. Because the amplitude of an incoming signal on a transmission medium may vary over a wide dynamic range, PLC modems may include an automatic gain control (AGC) circuit to adjust the amplitude of the incoming signal. More specifically, the AGC circuit is configured to provide a relatively constant output amplitude so that circuits following the AGC circuit may require less dynamic range.

In addition to the wide dynamic range of amplitude of data signals in PLC networks, several types of noise may be mixed into the data during transmission over the power line. For example, such noise may include periodic impulsive noise, aperiodic impulsive noise, narrow band noise, colored background noise, etc. Conventionally, AGC circuits implemented in PLC modems use a relatively large and fixed gain value to amplify the incoming signal. Using such a large gain parameter, which is fixed, may result in the AGC circuit becoming saturated/overloaded, possibly resulting in clipping of amplified signals.

The disclosed embodiments provide systems and methods to dynamically adjust a gain parameter of a PLC modem so as to avoid such saturation problem. The disclosed PLC modem sets an intermediate value as the default parameter gain.

FIG. 1 shows a block diagram 100 to illustrate the disclosed PLC modem 150 in accordance with various embodiments. In FIG. 1, the PLC modem 150 is coupled to a PLC network 90. The PLC network may include power lines to transmit either AC power or DC power.

More specifically, the PLC modem 150 includes an analog front end (AFE) unit 102 and a micro control unit (MCU) 104. The AFE unit 102 is configured to receive power and data transmitted from the PLC network 90. In accordance with various embodiments, the data may be formatted as a packet that includes a preamble and a payload. The AFE unit 102 further includes a gain controller 106. In accordance with various embodiments, the gain controller 106 may be implemented as an amplifier as well. The MCU 104 includes a root-mean-square (RMS) measurement unit 108.

In operation, upon receiving a packet, the AFE unit 102 initially amplifies the signal encoding the packet by using a default gain parameter. In the disclosed examples, the default gain parameter is implemented as an intermediate value between a minimum gain parameter and a maximum gain parameter. In one example, the gain parameter can be a value of two to the power of an integer value. The integer value may be from 1 to 5 (i.e., 1, 2, 3, 4, or 5). The initial default gain parameter, for example, may be a value from two to the powers of 3 to 5. The initial default gain parameter may be determined and set by the gain controller 106. Subsequently, the amplified signal encoding the packet (e.g., signal 103) is transmitted to the RMS measurement unit 108 of the MCU 104.

The RMS measurement unit 108 is configured to calculate a RMS power of the amplified signal 103. In one example, the RMS power is calculated by the RMS measurement unit 108 as the square root of the arithmetic mean of the square of the amplified packet signal's (103) power. The arithmetic mean is calculated by integrating the amplitude of the signal 103 over a period of time. In some illustrative embodiments, the period of time is equal to the time duration of a preamble of the received packet signal. For example, if the received packet signal includes a preamble that lasts 2 seconds, the time period used to calculate the arithmetic mean is 2 second.

Still referring to FIG. 1, after the RMS power is calculated by the RMS measurement unit 108, the MCU 104 calculates a difference value that is the difference between the calculated RMS power and a target RMS power. The target RMS power may be a value of RMS power desired by a user of the PLC modem 150. The difference value is then transmitted to the AFE unit 102 as a feedback signal 105. Based on the feedback signal 105, the AFE unit calculates an adjusted gain parameter to amplify the received packet signal. In some embodiments, the feedback signal may be zero, a positive value, or a negative value. If the feedback signal is zero, the PLC modem 150 makes no change to the default gain parameter. If the feedback signal is a positive value, the PLC modem may adjust (decrease) the default gain parameter to amplify the received packet signal. If the feedback signal is a negative value, the PLC modem may adjust (increase) the default gain parameter to amplify the received packet signal. Iteratively, the AFE unit 102 transmits a newly amplified packet signal based on the adjusted gain parameter to the RMS measurement unit 108, and the MCU 104 again calculates a new difference value between the target RMS power and a RMS power of the newly amplified packet signal. Based on the new difference value, the AFE unit 102 may continue to further adjust the gain parameter. Details of the operation of the PLC modem will be provided with respect to the method in FIG. 3. Moreover, the gain parameter is iteratively and dynamically adjusted based on a comparison of the signal's RMS power to a target RMS power.

Figure 2:
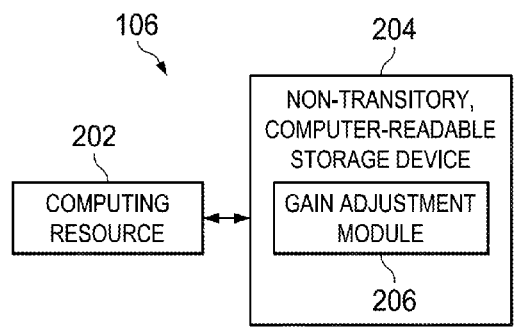
FIG. 2 shows an example to further illustrate a gain controller of a PLC modem in accordance with various examples.

FIG. 2 shows an example to further illustrate the gain controller 106 of the AFE 102 in accordance with various embodiments. The gain controller 106 may include a computing resource 202 coupled to a non-transitory, computer-readable storage device 204. The processing resource is a single hardware processor, a multiprocessor core, or any other type of hardware process. The non-transitory, computer-readable storage device 204 may be implemented as volatile storage (e.g., random access memory), non-volatile storage (e.g., hard disk drive, optical storage, solid-state storage, etc.) or combinations of various types of volatile and/or non-volatile storage.

The storage device 204 comprises an executable gain adjustment module 206 which includes executable machine instructions. As a result of executing the gain adjustment module 206 by the computing resource 202, the gain controller 106 may perform various operations, such as adjusting the gain parameter from the default value to amplify a signal containing a received packet, and iteratively determining whether to continue adjusting the gain parameter from its previous value to a new value. Details of the gain adjustment module 206 will be described with respect to the method in FIG. 4.

Figure 3:
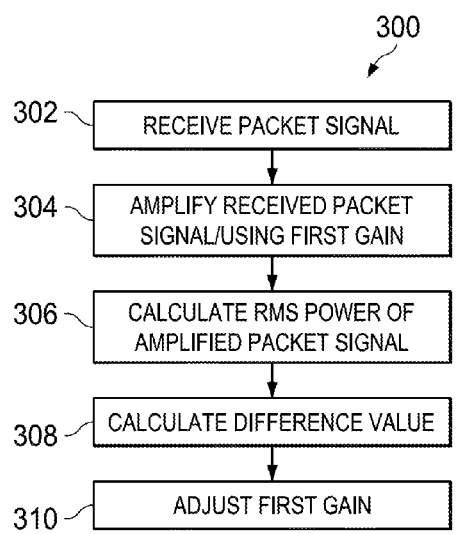
FIG. 3 shows a flow chart to illustrate a method to adjust a gain parameter of a PLC modem in accordance with various examples.

FIG. 3 shows a flow chart 300 to illustrate a method to adjust a gain parameter in accordance with various embodiments. The method starts in block 302 with receiving, by the AFE unit 102, the packet signal 101 from the PLC network 90. Continuing in block 304, the method includes amplifying the received packet signal 101 by using the default gain parameter. In accordance with various embodiments, the default gain parameter is an intermediate value, ranging from 3 to 5. More specifically, the amplification results from the computing resource 202 of the gain controller 106 executing the gain adjustment module 206.

After the received packet signal 101 is amplified using the default gain parameter, the amplified signal 103 is transmitted to the RMS measurement unit 108 of the MCU 104. The method continues in block 306 with calculating the RMS power of the amplified signal 103. In an embodiment, the calculation of the RMS power is implemented by the RMS measurement unit 108. In some examples, the RMS power of the amplified signal 103 is calculated over a period of time that is equal to the time duration of the preamble of the received packet signal 101. Different time periods may be used in other examples. The RMS measurement unit 108 then converts the RMS power into a decibel (dB) scale.

Still referring to FIG. 3, the method continues in block 308 with calculating a difference value between the RMS power calculated by the RMS measurement unit 108 and the target RMS power. Preferably, the difference value is calculated by the MCU 104. More particularly, the target RMS power may be defined by the MCU 104 as: ENOB×6 (dB)−backoff (dB), wherein ENOB is the effective number of bits for the AFE unit 102, and the backoff is selected to assure that there is no clipping at the output of the AFE unit 102. ENOB is a measure of the dynamic performance of the AFE unit 102, and ENOB is typically based on the AFE unit 102's resolution. Generally, the clipping may be due to an impulsive noise received from the PLC network. Moreover, the backoff may be selected to also reach an optimal peak-to-average ratio of the received packet signal.

Subsequently, the feedback signal 105, which includes the difference value, is transmitted back to the AFE unit 102. Upon receiving the difference value, the method continues in block 310 with adjusting, by the gain controller 106, the default gain parameter based on the difference value 105. In some embodiments, the adjustment is a result of executing the gain adjustment module 206. In block 310, the gain controller 106 divides the difference value 105 by a step gain parameter so as to produce an adjustment amount of gain parameter (ΔG). In accordance with various embodiments, the step gain parameter is 6 dB. Then the newly gain parameter is produced, by the gain controller 106, as the default gain parameter minus ΔG.

After the default gain has been adjusted, in some illustrative embodiments, the method may route back to block 304 with using the adjusted gain parameter (i.e., the default gain parameter—ΔG) to amplify the received packet signal 101. Iteratively, in block 306, the RMS measurement unit 108 calculates a RMS power of the newly amplified signal, and, in block 308, the MCU 104 is to calculate a new difference value between the target RMS power and the newly calculated RMS power. Subsequently, the AFE unit 102 is to use the newly calculated difference value to update the previously adjusted gain parameter (the default gain parameter—ΔG). In accordance with various embodiments, the iteration may end until the MCU 104 determines that a difference value between the target RMS power and a RMS power of an amplified packet signal is less than 5 dB. The amplified packet signal may be amplified using either the default gain parameter or an adjusted gain parameter.

Alternatively or additionally, in accordance with various embodiments, in block 302, if the AFE unit 102 detects a presence of a delimiter in the packet signal 101, the AFE unit 102 is to cease adjusting the default gain parameter, and is to use the default gain parameter to amplify the packet signal 101. The delimiter may be a 3-bit field of a packet. For example, a delimiter, 000, may represent "start of frame with no response expected".

Figure 4:
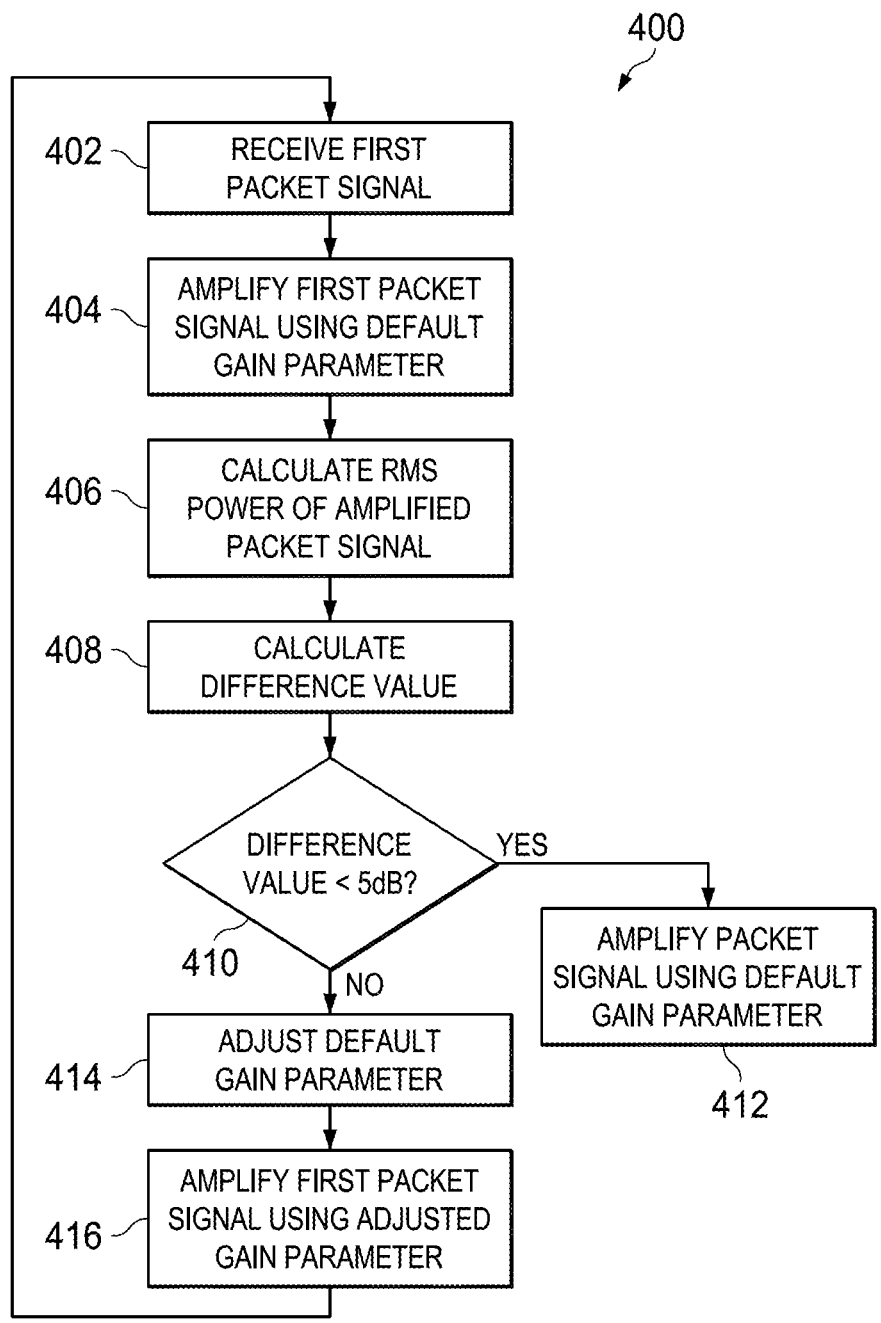
FIG. 4 shows a flow chart to further illustrate a method to adjust a gain parameter of a PLC modem in accordance with various embodiments

FIG. 4 shows a flow chart 400 to further illustrate a method to adjust the default gain parameter in accordance with various embodiments. The method starts in block 402 with receiving, by the AFE unit 102, a first packet signal (e.g., signal 101) from the PLC network 90. Continuing in block 404, the method includes amplifying the first packet signal by using the default gain parameter. In accordance with various embodiments, the default gain parameter is an intermediate value, ranging from 3 to 5. More specifically, the amplification results from the computing resource 202 of the gain controller 106 executing the gain adjustment module 206.

After the first packet signal is amplified using the default gain parameter, the amplified signal (e.g., signal 103) is transmitted to the RMS measurement unit 108 of the MCU 104. The method continues in block 406 with calculating the RMS power of the amplified signal. In an embodiment, the calculation of the RMS power is implemented by the RMS measurement unit 108. In some examples, the RMS power of the amplified signal is calculated over a period of time that is equal to the time duration of the preamble of the first packet signal. Different time periods may be used in other examples. The RMS measurement unit 108 then converts the RMS power into a decibel (dB) scale.

Still referring to FIG. 4, the method continues in block 408 with calculating a difference value between the RMS power calculated by the RMS measurement unit 108 and the target RMS power. Preferably, the difference value is calculated by the MCU 104. More particularly, the target RMS power may be defined by the MCU 104 as: ENOB×6 (dB)−backoff (dB), wherein ENOB is the effective number of bits for the AFE unit 102, and the backoff is selected to assure that there is no clipping at the output of the AFE unit 102. ENOB is a measure of the dynamic performance of the AFE unit 102, and ENOB is typically based on the AFE unit 102's resolution. Generally, the clipping may be due to an impulsive noise received from the PLC network. Moreover, the backoff may be selected to also reach an optimal peak-to-average ratio of the received packet signal.

Subsequently, the feedback signal (e.g., signal 105), which includes the difference value, is transmitted back to the AFE unit 102. Upon receiving the difference value, the method continues in block 410 with determining, by the gain controller 106, whether the difference value is smaller than 5 dB.

If the difference value is not less than 5 dB, the method routes to block 414 with adjusting the default gain parameter. In some embodiments, the adjustment is a result of executing the gain adjustment module 206. In block 414, the gain controller 106 divides the difference value 105 by a step gain parameter so as to produce an adjustment amount of gain parameter (ΔG). In accordance with various embodiments, the step gain parameter is 6 dB. Then the newly gain parameter is produced, by the gain controller 106, as the default gain parameter minus ΔG. After adjusting the default gain parameter, the method continues in block 416 with amplifying the first packet signal using the adjusted gain parameter, that is, the default gain parameter minus ΔG. Then, the method routes back to block 406 with calculating the RMS power of the first packet signal amplified by the adjusted gain parameter.

However, referring back to block 410, if the difference value is less than 5 dB, the method routes in block 412 with amplifying the first packet signal using the default gain parameter.

In accordance with some illustrative embodiments, the AFE unit 102 may subsequently receive a second packet signal. The PLC modem 150 will use the same method described in the flow chart 400 to adjust, if needed, the default gain parameter to amplify the second packet signal.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    an analog front end (AFE) unit configured to be coupled to a power line network and to receive a packet signal from the power line network, and wherein, based on a first gain parameter, the AFE unit is to amplify the received packet signal; and
    a controller coupled to the AFE unit and configured to calculate a root-mean-square (RMS) power of the amplified packet signal;
    wherein the AFE unit is to calculate a second gain parameter based on the calculated RMS power of the amplified packet signal and the first gain parameter, wherein the second gain parameter is to be used to amplify the received packet signal instead of the first gain parameter.

2. The system of claim 1 wherein the first gain parameter is an intermediate value that is between two to the power of three and two to the power of five.

3. The system of claim 1 wherein the controller calculates the RMS power of the amplified packet signal over a period of time substantially equal to the time duration of a preamble of the received packet signal.

4. The system of claim 1 wherein the controller calculates a difference value between the calculated RMS power of the amplified packet signal and a target RMS power.

5. The system of claim 4 wherein the AFE unit is to calculate the second gain parameter based on the difference value and the first gain parameter.

6. The system of claim 5 wherein the AFE unit, upon detecting a presence of a delimiter of the received packet signal, is to use the first gain parameter to amplify the received packet signal.

7. A system, comprising:
a front end unit to be coupled to a power line network is to use a first gain parameter to amplify a packet signal received from a power line network; and
a controller, coupled to the front end, is configured to receive the amplified packet signal from the front end unit and to calculate a difference value between a root mean square (RMS) power of the amplified packet signal and a target RMS power;
wherein, based on the difference value, the front end unit is to use a second gain parameter to replace the first gain parameter to amplify the received packet signal.

8. The system of claim 7 wherein the front end unit further comprises a gain controller that is operable to amplify the packet signal.

9. The system of claim 8 wherein the first gain parameter is preset by the gain controller to be an intermediate value.

10. The system of claim 7 wherein the target RMS power is based on an effective number of bits of the front end unit and a preset power offset.

11. The system of claim 7 wherein the front end unit is to divide the difference value by a gain step as an adjusted value that is used to adjust the first gain parameter to be replaced by the second the gain parameter.

12. The system of claim 7 wherein the front end unit, upon detecting a presence of a delimiter of the received packet signal, is to use the first gain parameter to amplify the received packet signal.

13. The system of claim 7 wherein the controller is to calculate the RMS power of the amplified packet signal over a period of time equal to the time duration of a preamble of the received packet signal.

14. A method, comprising:
receiving, by an analog front end (AFE) unit, a packet signal from a power line network;
based on a first gain parameter, amplifying, by the AFE unit, the received packet signal;
calculating, by a controller coupled to the AFE unit, a root mean square (RMS) power of the amplified packet signal;
calculating, by the controller, a difference value between the calculated RMS power and a target RMS power; and
based on the difference value, adjusting the first gain parameter to amplify the received packet signal.

15. The method of claim 14 wherein the first gain parameter is an intermediate value.

16. The method of claim 14 further comprising if a presence of a delimiter of the packet signal is detected by the AFE unit, amplifying the received packet signal using the first gain parameter before being adjusted.

17. The method of claim 14 comprising:
adjusting the first gain parameter iteratively based on the difference value; and
iteratively determining whether to continue adjusting the first gain parameter from its previous value to a new value.

18. The method of claim 17 comprising:
determining whether the difference value is less than a predetermined value; and
ending the iterative adjustment of the first gain parameter based on a determination that the difference value is less than the predetermined value.

19. The method of claim 14 comprising:
dividing the difference value by a predetermined value to produce an adjustment amount; and
adjusting the first gain parameter by the adjustment amount.

20. The method of claim 14 wherein the RMS power is calculated over a period of time equal to a time duration of a preamble of the received packet signal; further comprising converting the RMS power into a decibel (dB) scale.

* * * * *